United States Patent [19]

Dunn

[11] Patent Number: 4,672,627
[45] Date of Patent: Jun. 9, 1987

[54] ELECTRODE HEATER

[75] Inventor: Charles S. Dunn, Granville, Ohio

[73] Assignee: Owens-Corning Fiberglas Corporation, Toledo, Ohio

[21] Appl. No.: 810,636

[22] Filed: Dec. 19, 1985

[51] Int. Cl.⁴ .............................................. C03B 5/027
[52] U.S. Cl. ....................................................... 373/38
[58] Field of Search ........................ 373/36, 37, 38, 27

[56] References Cited

U.S. PATENT DOCUMENTS

| 1,542,716 | 6/1925 | Payne | 373/38 X |
| 2,122,241 | 6/1938 | Arnold | 13/5 |
| 2,635,388 | 4/1953 | Peyches et al. | 49/53 |
| 2,798,892 | 7/1957 | Penberthy | 373/38 |
| 3,151,201 | 9/1964 | Kilian et al. | 13/6 |
| 3,156,753 | 11/1964 | Gruber | 13/9 |

Primary Examiner—Roy N. Envall, Jr.
Attorney, Agent, or Firm—Ronald C. Hudgens; Greg Dziegielewski; Ronald E. Champion

[57] ABSTRACT

A method and apparatus for heating the portion of an electrode protruding from a glass melting furnace is disclosed. One embodiment of the invention describes an electrical resistance heated device. A second embodiment discloses a gas and air fired infrared heater device. Both devices allow the electrode to be heated to an elevated temperature without oxidation of the electrode thereby allowing the electrode to be forced into the furnace without damage to the furnace or the electrode.

3 Claims, 4 Drawing Figures

ELECTRODE HEATER

TECHNICAL FIELD

This invention relates to the field of glass melting. Specifically, an apparatus is described which allows the portion of an electrode which protrudes outside a glass melting furnace to be heated to an elevated temperature without oxidizing the electrode. This heating assists in adjusting the electrode into the furnace.

BACKGROUND OF THE INVENTION

In the production of glass items, particulate materials are melted in a glass furnace. The melting of the particulate material is accomplished by heating the material above its melting point by combustion of fossil fuel, by electrical heating or a combination of combustion and electrical heating. Electrical heating may be accomplished by arc melting wherein an electric arc is struck from an arc electrode to the conductive molten glass or to secondary electrodes submerged in the molten glass. Another electrical melting method is Joule heating wherein co-operating electrodes pass current between one another through the molten glass, heating the molten glass by Joule effect wherein the heating element is the resistance of the molten glass itself. In either case, electrodes protrude through the refractory of the furnace into the molten glass.

The electrodes can be constructed of any conductive material which will withstand the temperature and environment of the molten glass. Molybdenum has been found to be a good choice for electrode material. One problem with molybdenum is that it tends to oxidize at elevated temperatures. Two methods have been used to prevent oxidation. Water cooled jackets can be placed about the electrode where it enters the refractory of the furnace. This reduces the temperature of the portion of the electrode exposed to air below the point where the electrode will oxidize. The second method is to encase the hot portion of the electrode outside the furnace refractory with a purge can into which inert gas is piped. Here the electrode can be at an elevated temperature, but oxidation is prevented by exclusion of oxygen. In either case, the glass surrounding the electrode where it passes through the refractory is allowed to solidify forming a seal preventing molten glass from escaping from any clearance between the electrode and the refractory of the furnace.

This arrangement is fine for normal operation, but electrodes are consumed, wear and periodically need to be adjusted by inserting them further into the furnace. The solidified glass between the electrode and refractory of the furnace prevents the electrode from being merely pushed into the furnace. One current method of inserting electrodes into the furnace is to remove the cooling or purge can and heating the electrode with an open flame. This heat, hopefully, is sufficient to melt or at least soften the solidified glass about the electrode allowing the electrode to be pushed further into the furnace. This process is not always successful especially with higher melting point glasses, because the electrode must be kept below the oxidation temperature of the electrode.

A new and improved method and apparatus is needed to heat the electrodes to a higher temperature to facilitate adjusting the electrodes into the furnace without the risk of oxidizing the electrode.

DISCLOSURE OF INVENTION

The present invention describes an apparatus and method for heating to an elevated temperature the portion of an electrode which extends outside the walls of a glass mmelting furnace to an elevated temperature without causing oxidation of the electrode.

In one embodiment of the invention, a circular enclosure is designed to fit about the electrode. This enclosure is larger in diameter than the diameter of the electrode. A top and bottom are integral with the enclosure and have circular opening therein. A seal fits about the circular openings to form a gas tight seal which is both heat resistant and electrically insulating. An electrical resistance element of platinum, kanthol or other suitable material resides inside the enclosure supported by a heat resistant refractory or ceramic tube. There is a space between the tube and the electrode with the heating elements positioned about the tube away from the electrode between the tube and the enclosure. Insulation is positioned between the heating elements and the enclosure to prevent heat from being transmitted to the enclosure. An opening or orifice is provided in either the top or bottom of the enclosure to allow inert gas to be introduced between the ceramic tube and the electrode to prevent oxidation of the electrode. A thermocouple may be placed inside the enclosure to determine the temperature of the heating element by producing a signal which is fed to a controller. The controller can vary the power fed to the heating elements in response to the signal produced by the thermocouple to control the temperature of the electrode.

A second embodiment of the invention utilizes gas fired infrared heaters to heat the electrode. An enclosure is adapted to fit about the electrode and support the heaters. Gas burners are utilized to activate the infrared heaters. Suitable manifolds supply a gas and air mixture to be combusted by the burners. The mixture of gas and air is purposely deficient in oxygen so that incomplete combustion occurs producing a reducing or non-oxidizing product of combustion thereby preventing oxidation of the electrode. The enclosure has a top and bottom with openings about the periphery to allow the products of combustion of the gas air mixture to exit to the atmosphere. The top and bottom of the enclosure also have circular openings about which are fitted heat resistant, electrically insulating seals to contact the electrodes.

Both embodiments of the invention may be designed with a hinge and locking mechanism to allow the heater to be placed about the electrode without the necessity of removing the electrodes power source.

BEST MODE FOR CARRYING OUT THE INVENTION

The present invention as described below is an apparatus and method to heat an electrode used in a glass melting furnace to an elevated temperature. Elevated temperature is that temperature at which devitrified glass in a glass melting furnace will soften.

Figure 1:
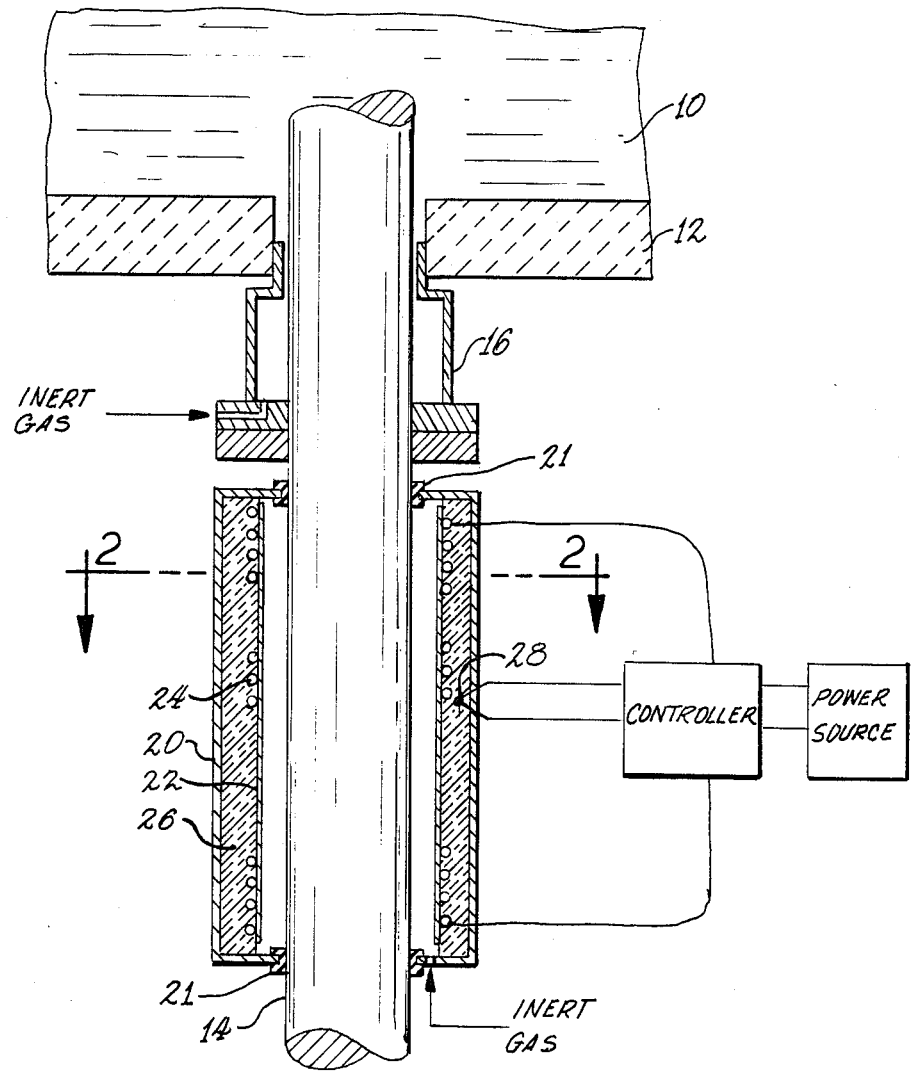
FIG. 1 is a sectional side view of an electrically heated electrode preheater.

Referring to FIG. 1, an electrode 14 is shown protruding through the refractory 12 of a glass melting furnace and projecting into the molten glass 10. The electrode in normal operation is connected to a power source (not shown) in conjunction with an adjacent electrode, and electricity is passed between the electrodes through the molten glass to heat the molten glass. The electrode in the molten glass is at an elevated temperature due to the flow of current through the molten glass. The electrode, as it leaves the furnace, tends to be hot due to conduction of the heat along the electrode.

In normal operation, a protector, or a purge can 16, is used to protect the portion of the electrode outside the furnace from oxidation. These purge cans can be of several types as is known in the art. The purge can shown in FIG. 1 uses inert gas to encompass the electrode as it emerges from the furnace to prevent oxidation. Other types of purge cans, such as water cooled cans, can be used wherein water is circulated through a chamber about the electrode to lower the temperature of the electrode as it emerges from the furnace below the temperature at which the electrode will oxidize.

In normal operation, the glass between the refractory and the electrode becomes devitrified and forms a seal about the electrode. It is desirable during normal operations to adjust the electrode by forcing the electrode further into the furnace to compensate for wear or erosion of the electrode. This becomes difficult because the glass forming the seal between the electrode and the refractory being solidified resists this adjustment.

FIG. 1 shows an example of an electrical resistance fired heater to raise the temperature of the electrode outside the furnace to the point that the devitrified glass between the electrode and the refractory will soften and allow the electrode to be forced further into the furnace. The heater has an enclosure 20 which is generally cylindrical in shape and has a top and a bottom in conjunction with the enclosure.

The top and the bottom of the enclosure has a generally circular opening to fit about the electrode. A seal 21, which is both heat resistant and electrically nonconductive, fits about the circular opening in the top and bottom of the enclosure and contacts the electrode to form a gas tight seal. Inside the enclosure is a tube 22 which can be made of a refractory or ceramic type material that is heat resistant and is also generally cylindrical in shape.

Wound about the exterior of the ceramic tube is electrical resistant heating elements 24 which can be made of any suitable resistance materials, such a platinum or kanthol, that will allow electrical current to heat them to an elevated temperature. Insulation 26 is placed between the ceramic tube and the enclosure about the resistance heating elements to prevent the transfer of heat to the enclosure.

An orifice, or opening, in the bottom of the enclosure for insertion of an inert gas is also shown. The inert gas is injected between the electrode and the ceramic tube to prevent oxidation of the electrode when the heater is heated to an elevated temperature.

A thermocouple 28 can be imbedded in the enclosure to monitor the temperature of the heater. The thermocouple can be connected to a controller, and the controller can adjust the power transmitted to the heating elements to adjust the degree of heating of the heater. The controller is connected to a suitable power source as is known in the art to provide power to the heating elements.

Figure 2:
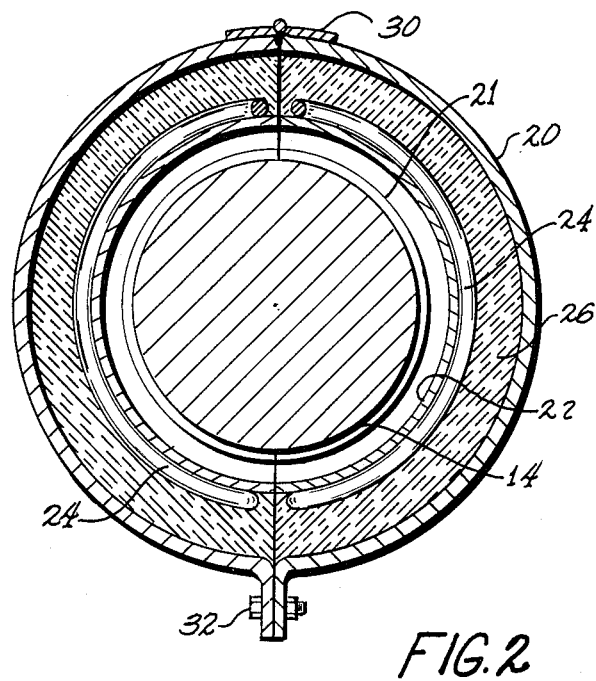
FIG. 2 is a sectional top view of an electrically heated electrode preheater.

FIG. 2 is a sectional view of the heater along section lines 22 of FIG. 1. FIG. 2 shows an embodiment in which the enclosure, the heating elements and the ceramic tube can be made into two segments and hinged by hinge number 30. A suitable clamping means 32 then can clamp the heating assembly about the electrode.

In operation, the power to the electrode can be removed, the purged can can be slipped down away from the electrode and the heater can be slipped over the end of the electrode up against the refractory; or, in an alternative embodiment, the enclosure, being hinged, can be opened and wrapped about the electrode and then clamped in place with or without removal of the purge can.

The heater is placed about the electrode, and power is applied to raise the portion of the electrode outside of the furnace to an elevated temperature. Generally, temperatures in excess of 2,000° F. will soften the glass between the refractory and the electrode allowing the electrode to be adjusted up into the furnace.

Figure 3:
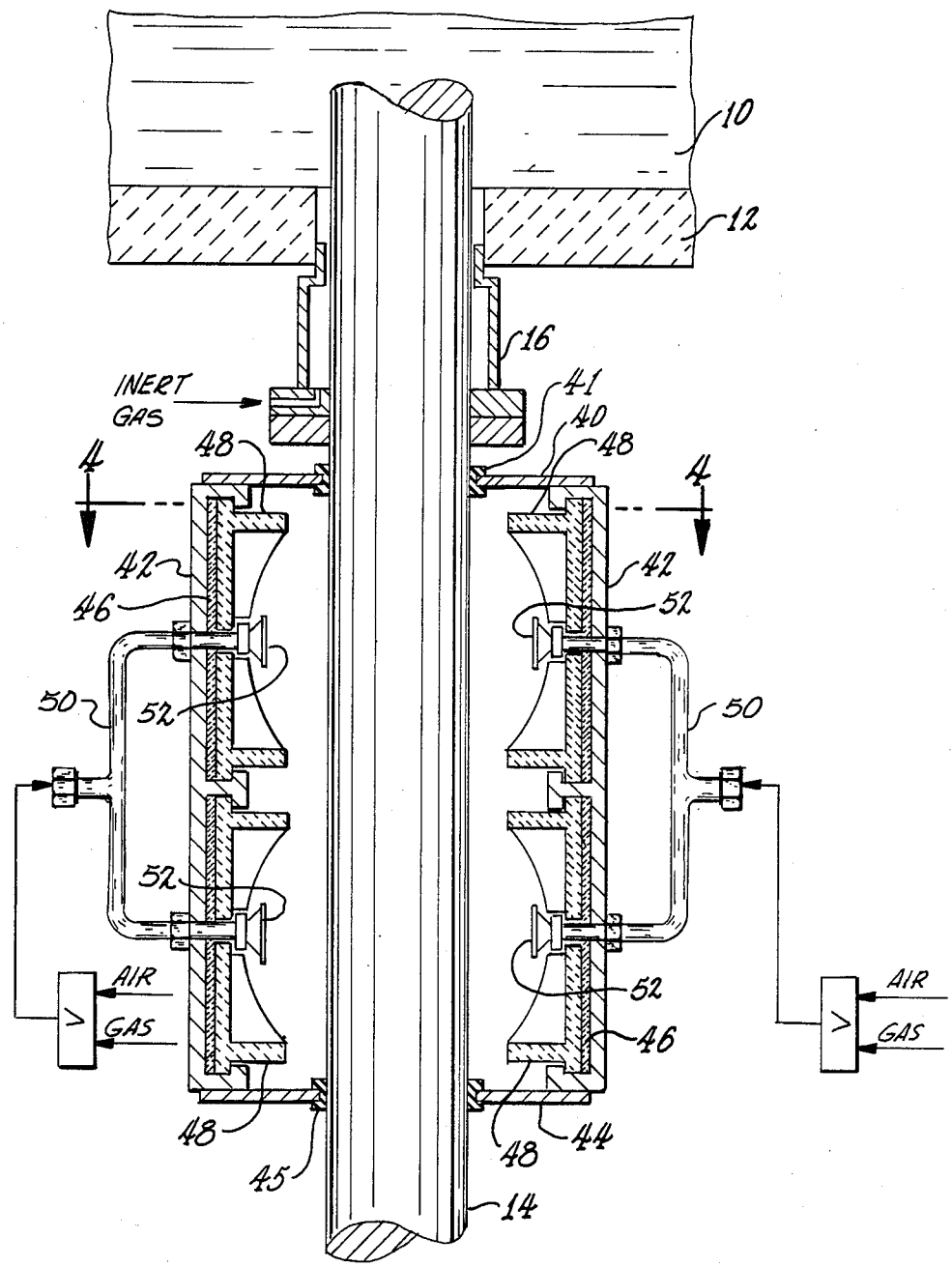
FIG. 3 is a sectional side view of a gas fired electrode preheater.

A second embodiment of the heater is shown in FIG. 3. In this embodiment, infrared heaters are used to heat the electrode. An enclosure 42 is adapted to support the infrared heaters. The enclosure has a top 40 and a bottom 44 which are adapted to support and guide the enclosure about the electrode.

Both the top and the bottom have circular openings about which are fitted seals 41 which are heat resistant and electrically insulating. The top and the bottom also have openings whereby products of combustion of the gas mixture used to heat the infrared heaters may escape into the atmosphere.

Infrared heaters 48 of a ceramic material are used to heat the electrode. These heaters may be similar to those manufactured by Ray Manufacturing Company of Cliffside Park, New Jersey. The heaters are fired by burners 52 which are attached to suitable manifolding 50 and then to an air and gas supply source. Insulation 46 is provided to insulate the heat produced by the infrared heaters from the enclosure.

In this embodiment of the invention, the air gas mixture is purposely made reducing, that is, it is deficient in oxygen such that the products of combustion produce a reducing atmosphere which will not cause oxidation of the electrode.

Figure 4:
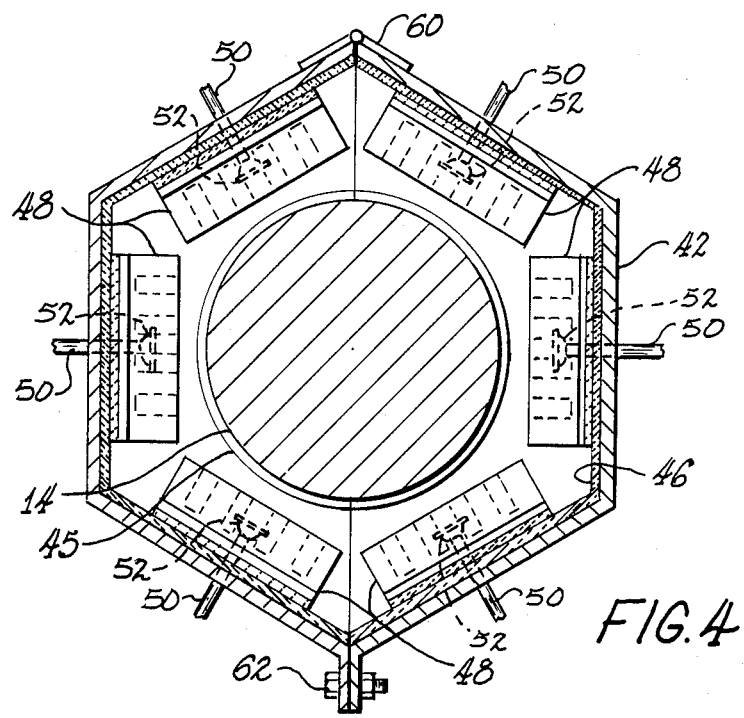
FIG. 4 is a sectional top view of a gas fired electrode preheater.

FIG. 4 is a sectional view along section lines 4—4 of FIG. 3. This shows how the enclosure of FIG. 3 may be hinged with hinge number 60 and held together with suitable clamping means 62. In this method, the enclosure may be opened, positioned about the electrode and then clamped in position.

INDUSTRIAL APPLICABILITY

In an electrical fired or electrical boost glass melting furnace electrodes protrude through the refractory of the furnace into the molten glass. The glass at the electrode-refractory interface solidifies causing a seal and preventing the electrode from being adjusted further into the furnace. The present invention allows supplemental heating to the portion of the electrode protruding outside the furnace. This supplemental heating softens the solidified glass between the electrode and the furnace refractory allowing the electrode to be positioned further into the furnace.

I claim:

1. A heater for an electrode of a glass furnace comprising: a cylindrical enclosure adapted to fit about an electrode; said enclosure having circular openings on the top and bottom thereof; a heat resistant electrically insulating seal fitting in each circular opening between said enclosure and said electrode; a heating means comprising electrical resistance heaters wound about the exterior of a ceramic tube which fits inside said enclosure; means for varying amount of heat produced by said heating means; and a means to prevent oxidation of said electrode.

2. A heater for an electrode of a glass furnace as recited in claim wherein said means for varying the amount of heat produced by said heating means comprises a power source connected to a controller; a thermocouple positioned within said enclosure to produce a signal indicative of temperature; and said controller responsive to said signal from said thermocouple to vary the amount of power from said power source to said electrode.

3. A heater for an electrode of a glass furnace comprising:

(a) a cylindrical enclosure with a circular opening in the top thereof and a circular opening in the bottom thereof;
(b) a first heat resistant, electrically insulating seal fitting about the top circular opening of the cylindrical enclosure and adapted to contact and fit tightly about an electrode;
(c) a second heat resistant, electrically insulating seal fitting about the bottom circular opening of the cylindrical enclosure and adapted to contact and fit tightly about the electrode;
(d) a ceramic tube attached inside said cylindrical enclosure with the interior of said ceramic tube encircling said electrode;
(e) electrical resistance heating elements wound about the exterior of said ceramic tube inside said cylindrical enclosure;
(f) insulation positioned inside said cylindrical enclosure about said heating elements between said ceramic tube and said cylindrical enclosure;
(g) a controller attached to said electrical resistance heating elements for varying the amount of heat produced by said heating elements; and
(h) a means to introduce inert gas between said electrode and said ceramic tube to prevent oxidation of said electrode.

* * * * *